United States Patent Office 3,592,783
Patented July 13, 1971

3,592,783
POROUS POLY(ARYLENE SULFIDE) COMPOSITIONS AND METHOD FOR PRODUCING SAME
James T. Edmonds, Jr., Bartlesville, Okla., assignor to Phillips Petroleum Company
No Drawing. Filed Apr. 9, 1969, Ser. No. 814,826
Int. Cl. C08g 51/04, 53/08
U.S. Cl. 260—2.5          6 Claims

ABSTRACT OF THE DISCLOSURE

Porous compositions of a poly(arylene sulfide) polymer and a particulate heat resistant material which are suitable for forming into bearings or other articles of manufacture are prepared by (a) forming a slurry of a poly(arylene sulfide) polymer having a particle size of 1 to 3500 microns with a particulate heat resistant compound such as asbestos having a particle size of 1 to 3500 microns in a volatilizable liquid, (b) compressing the resulting slurry so as to form an integral molded composition having from 0.1 to 70 weight percent residual volatilizable liquid therein, (c) heating the resulting composition at a first temperature in the range of 0° C. to 230° C. so as to substantially volatilize the residual liquid therein, (d) thereafter additionally heating the resulting composition at a second temperature in the range of 250 to 500° C., and (e) thereafter recovering the resulting porous, filled poly(arylene sulfide) composition as a product of the process.

This invention relates to process for the production of novel porous, filled poly(arylene sulfide) compositions.

BACKGROUND OF THE INVENTION

In recent years a wide variety of polymeric materials have been used in the formation of bearings. While in some applications metal bearings are still preferred, for many other applications nonmetallic bearings are not only suitable but are superior to the conventional metal bearings. Polymeric materials which have been utilized as bearings include poly(tetrafluoroethylene), polyamides, polyacetals, phenolformaldehyde resins, and the like. Such materials have been used for forming bearing plates, thrust bearings, cams, gears and other types of bearing surfaces in situations where additional lubrication is generally to be avoided and in medium to light load bearing situations. While bearings formed from the various polymeric materials have proven useful for many purposes, such bearings have limited utility due to their instability to heat and inability to carry high loads. In addition in some applications where additional lubricant is desired such bearings are unsatisfactory due to their inability to retain the additionally desired lubricant thereon. Thus, there still remains a need for compositions and bearings made therefrom which not only have a low coefficient of friction, high load carrying capacity, and high temperature stability but which in addition are capable of containing additional lubricant.

THE INVENTION

Accordingly, it is an object of this invention to provide a process for the production of novel porous polymeric compositions which are useful for the formation of shaped articles such as a nonmetallic bearing.

Another object of this invention is to provide a novel, porous poly(arylene sulfide) composition.

Other aspects, objects and the several advantages of this invention will be apparent to those skilled in the art from consideration of the following disclosure and the appended claims.

In accordance with the present invention I have discovered that porous poly(arylene sulfide) polymer compositions having a particulate heat resistant material therein and which are useful for the formation of a variety of articles of manufacture such as nonmetallic bearings are prepared by the formation of a slurry of a poly(arylene sulfide) polymer having a particle size of 1 to 3500 microns with a particulate heat resistant compound having a particle size of 1 to 3500 microns in a volatilizable liquid, compressing the resulting slurry so as to form an integral molded composition therefrom having from 0.1 to 70 weight percent residual liquid therein, heating the resulting composition at a first temperature in the range of 0° C. to 230° C. so as to substantially volatilize the residual liquid, thereafter additionally heating the resulting liquid free composition at a second temperature in the range of 250 to 500° C. and thereafter recovering the resulting porous, filled poly(arylene sulfide) composition as a product of the process.

In carrying out the compression step of the process whereby the solids content of the slurry is formed into a coherent mass, if desired a portion of the liquid phase of the slurry can be first removed by any means such as filtration and the remaining mass comprising the solid material phase of the slurry is thereafter subjected to compression as described. Likewise the liquid phase can be removed during the compression step by using, for example, a mold which permits the liquid phase to flow from the confines of the mold.

The solid, particulate poly(arylene sulfide) polymers which are useful in the formation of the porous compositions of the instant invention are those formed by the reaction of at least one polyhalo-substituted monocyclic aromatic compound with an alkali metal sulfide. Such polymers are well known in the art and are disclosed in U.S. Pat. No. 3,354,129 of Edmonds and Hill.

Such polymers are further characterized by their ability to be converted to a cross-linked polymer upon heating at a temperature in the range of 250 to 500° C. and by their passing through a fluid state prior to cross linking.

Some specific examples of suitable polyhalo-substituted cyclic aromatic compounds which can be employed are:

1,2-dichlorobenzene
1,3-dichlorobenzene
1,4-dichlorobenzene
2,5-dichlorotoluene
1,4-dibromobenzene
1,4-diiodobenzene
1,4-difluorobenzene
2,5-dibromoaniline
N,N-dimethyl-2,5-dibromoaniline
1,3,5-trichlorobenzene
1,2,4,5-tetrabromobenzene
hexachlorobenzene
1-n-butyl-2,5-dichlorobenzene
1-cyclohexyl-2,5-diiodobenzene
1-isooctyl-2,4-difluorobenzene
1-n-dodecyl-2,5-dichlorobenzene
1-benzyl-2,5-dibromobenzene 1,4-di-n-butyl-2,5-dichlorobenzene
1,4-di-n-nonyl-2,6-dibromobenzene
1,3,5-trichloro-2,4,6-triphenylbenzene
1,4-dibromo-2,3,5,6-tetra(4-ethylphenyl)benzene
methyl 2,5-dichlorobenzoate
isopropyl 2,3,5-tribromobenzoate
cyclohexyl 2,4,6-triiodobenzoate
phenyl 2,3,4,5,6-pentachlorobenzoate
2,5-dichlorobenzoamide
N,N-di-n-dodecyl-2,4,5-tribromobenzoamide
1-methoxy-2,5-dichlorobenzene
1-cyclohexylthio-2,5-dichlorobenzene
1,4-dibromo-2,3,5,6-tetrafluorobenzene
4-chlorobromobenzene
2,5-dichlorobenzene-sulfonic acid
sodium 2,5-dibromobenzenesulfonate The alkali metal sulfides which can be employed in the formation of polymers for use in the process of this invention are represented by the formula $M_2S$ wherein M is an alkali metal, and includes the monosulfides of sodium, potassium, lithium, rubidium and cesium, including the anhydrous and hydrated forms of these sulfides. The preferred sulfide reactant is $Na_2S$ and its hydrates.

The polymers which are used in forming the novel compositions of this invention can be prepared by contacting the above-defined reactants in a polar solvent at a temperature of from about 125° to about 450° C. The mol ratio of polyhalo-substituted aromatic compounds to $M_2S$ reactants should be at least 0.9:1 and will generally not exceed 2.0:1.

The polar organic compounds which are employed as reaction media in the formation of the polymers for use in the process of this invention should be solvents for the polyhalo-substituted compounds and the alkali metal sulfides. Representative examples of suitable classes of compounds include amides, lactams, sulfones and the like. Specific examples of such compounds are hexamethylphosphoramide, tetramethylurea, N,N'-ethylene dipyrrolidone, N-methyl-2-pyrrolidone (NMP), pyrrolidone, caprolactam, sulfolane, dimethylacetamide, low molecular weight polyamides and the like.

The particulate poly(arylene sulfide) polymer to be employed in the process of this invention should be of a particle size of 1 to 3500 microns. Thus, following formation of the polymer such as in the manner above described, the resulting polymer can be reduced to the required particulate form, if necessary, prior to the slurrying of same with the particulate heat resistant materials in the volatilizable liquid.

Generally, the particle size of both the poly(arylene sulfide) polymer and the heat resistant material are in the range of from 1 to 3500 microns in diameter.

The respective materials can be reduced to the desired particle size by any means known to the art such as grinding, ball milling and the like.

The particulate heat resistant materials which are employed in combination with the polymeric composition can be any of a number of known compounds. Examples of suitable materials include asbestos, aluminum carbide, metal powders, molybdenum sulfide, graphite, silica, glass, carbon black, titania, zirconia, alumina, and the like.

In preparing the porous compositions of the instant invention the particulate organic polymer and the particulate heat resistant material are present in amounts in the ratio of 0.1:1 to 10:1 of organic polymer to heat resistant material, preferably in the range of 0.5:1 to 5:1 (weight ratios).

The volatilizable liquid can be any liquid which is substantially nonreactive with the other materials of the composition and which is volatilizable at the temperatures employed in carrying out the first heating step of the process without deleterious decomposition. Examples of such suitable liquids are water, ethanol, methanol, 2-propanol, hexane, ethylene glycol, acetone, xylene, tetrahydrofuran, tetrahydropyran, 4-chlorotetrahydropyran, and the like, as well as mixtures thereof.

If desired, vacuum can be employed to promote the volatilization of any of these liquids. However, volatilization at atmospheric pressure is most feasible and generally employed.

The particulate polymer and heat resistant material can be formed into a slurry in the volatilizable liquid by any means known to the art. One suitable means is by the use of a high speed blender.

In keeping with the process of this invention, following formation of a slurry of particulate poly(arylene sulfide) polymer, filler and volatilizable liquid, the resulting slurry is thereafter subjected to compression so as to form a compressed composition which contains at least 0.1 and preferably at least 2.0 to 70 weight percent volatilizable liquid. It is essential that at least 0.1 percent of the volatilizable liquid remain to assure pore formation on volatilization of the liquid.

Any pressure which will allow at least this range of volatilizable liquid to remain in combination with the polymer and filler can be employed. However at least sufficient pressure should be employed so that the compressed mass has sufficient integrity to remain intact through the remaining steps of the process. In general, molding pressures in the range of about 5,000 p.s.i.g. to about 50,000 p.s.i.g. are employed. However, greater or lesser pressures can be employed, if desired, so long as the requisite liquid content is provided and the composition has the required integrity for further processing.

Following molding, the resulting compressed organic polymer and heat resistant material containing mass having the requisite residual liquid therein is heated at a first temperature in the range of 0° C. to 230° C. for a time sufficient to substantially remove the residual liquid from the compressed mass. The specific temperature and pressure employed will of course be dependent upon the particular volatilizable liquid employed in the forming of the slurry. Heating is ordinarily carried out for a period of 10 minutes to 48 hours at atmospheric pressure.

Following the first stage whereby the volatilizable liquid is substantially removed from the compressed polymer-particulate heat resistant material containing mass, the resulting substantially liquid free mass is thereafter further heated at a second and high temperature for a period of time so as to substantially cross link the polymer.

The specific temperature and time to be employed will depend upon the particular poly(arylene sulfide) polymer to be cross-linked but in any event should be sufficient to convert the organic polymer to a cross-linked polymer and must be sufficient to form a coherent mass.

In general, the poly(arylene sulfide) heat resistant material compositions are converted into cross-linked polymers by heating the compressed mass at a temperature in the range of about 250 to 500° C. for a time sufficient to render the materials substantially cross-linked. Generally heating for a time in the range of 10 minutes to 10 hours is adequate.

The composition following heating is substantially porous with interconnecting pore cavities and is comprised of particles of heat resistant material and heat resistant cross-linked poly(arylene sulfide) polymer. According to the presently preferred embodiment, a matrix of particles of heat resistant material is adhered with cross-linked poly(arylene sulfide) in such a manner that interconnecting pores are evident.

The resulting porous compositions can be subsequently machined by conventional methods into any desired form. Such articles are particularly valuable as bearings, but can also advantageously be employed as filters, molded articles, insulators for heat and electricity, and the like.

According to one preferred embodiment of this invention, the porous articles as produced herein are subsequently impregnated with a liquid lubricant such as water, mineral oil, and the like. This can be done by immersing the porous article into the liquid with which it is to be impregnated and drawing a vacuum thereon. The porous article can also be simply soaked in the lubricant and will readily absorb considerable quantities thereof. Alternatively, the porous article can be exposed to a vacuum and then submerged in the liquid with which it is to be impregnated which is also under vacuum.

The fabricated articles formed from the compositions of this invention are particularly valuable as bearings in machinery which must operate under conditions wherein dirt, grit, and the like are likely to enter the bearings, e.g., disc type farm equipment, cotton pickers, grain combines, swathers, side-delivery rakes, hay balers, and the like.

The porous compositions of this invention formed of a poly(arylene sulfide) polymer and a heat resistant material are characterized by their having a plurality of pores therein which are in sufficient amount to give a porous volume of from 0.1 to 2.5 cc./gram, and wherein the pores therein have a pore diameter in the range of 0.1 to 100 microns.

The following examples are presented to further illustrate the invention.

EXAMPLE I

A total of 400 grams of poly(phenylene sulfide) polymer formed by the reaction of p-dichlorobenzene and sodium sulfide and having a particle size of about 5–50 microns for most of the particles was blended with 400 grams of fine asbestos floats (grade 7–RF1 Johns-Manville Co.) and sufficient water to form a thick slurry.

The slurry was filtered and the resulting wet filter cake pressed into a cavity mold 6 inches square at 20,000 p.s.i.g.

The molded article was removed from the press and dried for about 16 hours at 88° C. to volatilize the water. Thereafter the essentially water free composition was heated at 371° C. for 6 hours in air.

A slab of the resulting porous composition was sawed off and following the carrying out of appropriate tests was found to have the following properties:

| Property | Test | Value |
| --- | --- | --- |
| Flexural modulus | ASTM-D790 | 0.284 |
| Tensile break | ASTM-D638 | 1,781 |
| Shore D hardness | ASTM-D2240 | 62 |

The remaining portion of the porous composition was machined into shaft and end bearings for use in a Ben Pearson cotton picker. The fabricated bearings were immersed in 90 weight base oil and a vacuum was applied to same so as to impregnate the bearings with oil. The oiled bearings were thereafter field evaluated on the cotton picker and found to give superior performance and longer service than the oiled oak bearingss previously employed.

EXAMPLE II

Another porous composition was formed in the manner of Example I with the exception that 30,000 p.s.i.g. pressure was employed.

Bearings fabricated from the porous composition were impregnated with oil and thereafter field tested on a Ben Pearson cotton picker. The oil impregnated poly(arylene sulfide) bearing was likewise found to give superior wear in contrast to the wooden bearings previously employed on the cotton picker.

EXAMPLE III

Poly(phenylene sulfide) having a particle size of about 5–50 microns which was formed by the reaction of p-dichlorobenzene and sodium sulfide was blended with fine asbestos floats (grade 7–RF1 Johns-Manville Co.) and water in a series of runs employing a high speed blender. The resulting slurries were filtered. The resulting filter cakes were thereafter molded at 10,000 p.s.i.g. into 6 inch square slabs. The slabs were weighed and dried in an air over at 200° C. for 16 hours. The dried slabs were weighed and heated in an air oven at 371° C. for 1 hour, and subsequently reweighed. The following table summarizes relevant data:

TABLE I

| | Grams | | | | | |
| --- | --- | --- | --- | --- | --- | --- |
| Run No. | Asbestos | PPS [1] | Water | Wet cake | Dry cake [2] | Cured cake [3] |
| 1 | 100 | 300 | 1,500 | 641 | 363 | 360 |
| 2 | 200 | 200 | 2,000 | 628 | 376 | 371 |
| 3 | 300 | 100 | 2,000 | 635 | 393 | 387 |

[1] PPS is poly(phenylene sulfide).
[2] Dry cake is the filter cake subsequent to drying at 200° C. for 16 hours.
[3] Cured cake is the filter cake subsequent to cross linking at 371° C. for 1 hour.

From these data it is readily calculated that the water content of the molded articles and the pore volume of the cross-linked articles are as follows:

TABLE II

| Run No. | Water content of molded article, wt. percent | Pore volume, cc./g. |
| --- | --- | --- |
| 1 | 44 | 0.78 |
| 2 | 41 | 0.69 |
| 3 | 39 | 0.65 |

EXAMPLE IV

Cross-linked porous articles were prepared substantially as in Example III except that a curing period of 2 hours at 371° C. was employed instead of a curing period of 1 hour at 371° C.

The cross-linked porous slabs were ground in a Wiley mill to particles about ⅛ inch in diameter subsequent to curing. Pore volume distribution was then determined for the ground particles from each porous slab with a mercury porosimeter. The following data was obtained.

TABLE III

| | Grams | | |
| --- | --- | --- | --- |
| Run No. | Asbestos | PPS [1] | Results |
| 1 | 100 | 300 | 58.8% of the pore volume was in the pore diameter range of 31–57 microns. |
| 2 | 200 | 200 | 50.5% of the pore volume was in the pore diameter range of 2–13 microns. |
| 3 | 300 | 100 | 52.1% of the pore volume was in the pore diameter range of 0.9–5 microns. |

[1] Poly(phenylene sulfide).

Reasonable variations and modifications of this invention can be made, or followed, in view of the foregoing disclosure, without departing from the spirit or scope thereof.

I claim:

1. A porous heat resistant composition consisting essentially of a poly(arylene sulfide) polymer and a particulate heat resistant material, said polymer and particulate material being present in an amount in the ratio of 0.1:1 to 10:1 of polymer to heat resistant material, and said composition having a porosity of 0.1 to 2.5 cc./g. and a pore diameter of 0.1 to 100 microns.

2. The composition according to claim 1 wherein said polymer is poly(phenylene sulfide) and said particulate heat resistant material is asbestos.

3. A process for the formation of a porous poly(arylene sulfide) composition which compirses:
   (a) forming a slurry of a particulate poly(arylene sulfide) polymer having a particle size of 1 to 3500 micorns with a particulate heat resistant material having a particle size in the range of 1 to 3500 microns in a volatilizable liquid;
   (b) compressing the resuling slurry so as to form an integral molded composition having from 0.1 to 70 weight percent of residual volatilizable liquid therein;

(c) heating the resulting composition at a first temperature in the range of 0° C. to 230° C. so as to substantially volatilize the residual liquid therein;

(d) thereafter further heating the resulting substantially liquid free composition at a second temperature in the range of 250° C. to 500° C.; and (e) thereafter recovering the resuting porous heat resistant material containing poly(arylene sulfide) composition as a product of the process.

4. A process according to claim 3 wherein said polymer is poly(phenylene sulfide).

5. A process according to claim 4 wherein said liquid is water.

6. A process according to claim 5 wherein said heat resistant filler composition is asbestos.

References Cited
UNITED STATES PATENTS

| | | | |
|---|---|---|---|
| 2,206,643 | 7/1940 | Patrick | 260—2.5 |
| 3,164,643 | 1/1965 | Hubbard | 260—2.5 |
| 3,285,850 | 11/1966 | Graham | 252—12 |
| 3,354,129 | 11/1967 | Edmonds et al. | 260—79.1 |
| 3,457,242 | 7/1969 | Hill | 260—79.1 |
| 3,478,000 | 11/1969 | Saunders et al. | 260—79.1 |

MURRY TILLMAN, Primary Examiner

W. J. BRIGGS, SR., Assistant Examiner

U.S. Cl. X.R.

252—12; 260—37, 79.1; 264—53